United States Patent
Shao et al.

(10) Patent No.: US 11,446,565 B2
(45) Date of Patent: Sep. 20, 2022

(54) IN-GAME DISPLAY CONTROL METHOD AND APPARATUS, STORAGE MEDIUM PROCESSOR, AND TERMINAL

(71) Applicant: NETEASE (HANGZHOU) NETWORK CO.,LTD., Zhejiang (CN)

(72) Inventors: Kun Shao, Zhejiang (CN); Zheng Jin, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/632,547

(22) PCT Filed: May 10, 2019

(86) PCT No.: PCT/CN2019/086464
§ 371 (c)(1),
(2) Date: Jan. 21, 2020

(87) PCT Pub. No.: WO2020/143148
PCT Pub. Date: Jul. 16, 2020

(65) Prior Publication Data
US 2021/0322864 A1 Oct. 21, 2021

(30) Foreign Application Priority Data

Jan. 10, 2019 (CN) .......................... 201910024151.3

(51) Int. Cl.
*A63F 13/2145* (2014.01)
*A63F 13/42* (2014.01)
(Continued)

(52) U.S. Cl.
CPC .......... *A63F 13/2145* (2014.09); *A63F 13/42* (2014.09); *A63F 13/44* (2014.09); *A63F 13/5258* (2014.09); *A63F 13/92* (2014.09)

(58) Field of Classification Search
CPC ...... A63F 13/2145; A63F 13/92; A63F 13/44; A63F 13/5258; A63F 13/42; A63F 13/214
See application file for complete search history.

(56) References Cited

U.S. PATENT DOCUMENTS

2014/0357356 A1* 12/2014 Horie ...................... A63F 13/42
463/31
2015/0258430 A1* 9/2015 Alexeev ............. A63F 13/5375
463/36
(Continued)

FOREIGN PATENT DOCUMENTS

CN         105094346 A    11/2015
CN         107661630 A     2/2018
(Continued)

*Primary Examiner* — Chase E Leichliter
(74) *Attorney, Agent, or Firm* — Gang Yu

(57) ABSTRACT

An in-game display control method and apparatus, a storage medium, a processor, and a terminal are provided. The method includes: a first touch operation acting on a preset area of a graphical user interface is detected; a scene display area is updated according to the first touch operation; a second, touch operation acting on a skill control of the graphical user interface is detected, and the skill control corresponds to a skill, of a first virtual character; a release direction of the skill is controlled according, to the second touch operation; and when the first touch operation and the second touch operation are detected at least partially overlap in timing, a focus position in the release direction is determined, and the scene display area in a game scene is updated according to the focus position in the release direction.

14 Claims, 3 Drawing Sheets

(51) Int. Cl.
  *A63F 13/44* (2014.01)
  *A63F 13/5258* (2014.01)
  *A63F 13/92* (2014.01)

(56) References Cited

U.S. PATENT DOCUMENTS

| | | | | |
|---|---|---|---|---|
| 2016/0199728 | A1* | 7/2016 | Yoon | A63F 13/2145 463/37 |
| 2017/0021270 | A1* | 1/2017 | Wang | A63F 13/814 |
| 2018/0024660 | A1* | 1/2018 | Wang | G06F 3/0484 273/110 |
| 2018/0028906 | A1* | 2/2018 | Tang | G06F 3/04842 |
| 2018/0043260 | A1* | 2/2018 | Tang | G06F 3/0488 |
| 2018/0071628 | A1* | 3/2018 | Tang | A63F 13/25 |
| 2018/0121086 | A1* | 5/2018 | Wang | G06F 3/04886 |
| 2018/0147488 | A1* | 5/2018 | Tang | A63F 13/92 |
| 2018/0311579 | A1* | 11/2018 | Matsui | A63F 13/42 |
| 2018/0369693 | A1* | 12/2018 | Rong | G06F 3/0484 |
| 2019/0022521 | A1* | 1/2019 | Wang | G06F 3/0488 |
| 2019/0030431 | A1* | 1/2019 | Zhang | A63F 13/5378 |
| 2019/0060745 | A1* | 2/2019 | He | A63F 13/52 |
| 2019/0060767 | A1* | 2/2019 | Shao | A63F 13/837 |
| 2019/0070495 | A1* | 3/2019 | He | A63F 13/428 |
| 2019/0070496 | A1* | 3/2019 | He | A63F 13/54 |
| 2019/0091561 | A1* | 3/2019 | Li | G06F 3/04842 |
| 2019/0091570 | A1* | 3/2019 | Wang | G06F 3/04883 |
| 2019/0265882 | A1* | 8/2019 | Nakahara | G06F 3/0488 |
| 2019/0366213 | A1* | 12/2019 | Zhou | A63F 13/5375 |
| 2020/0155941 | A1* | 5/2020 | Ito | A63F 13/533 |
| 2020/0254333 | A1* | 8/2020 | Tong | A63F 13/35 |
| 2020/0282308 | A1* | 9/2020 | Guo | A63F 13/537 |
| 2020/0293154 | A1* | 9/2020 | Qiu | G06F 3/04817 |
| 2020/0298104 | A1* | 9/2020 | Wang | G06F 3/04883 |

FOREIGN PATENT DOCUMENTS

| | | |
|---|---|---|
| CN | 107678663 A | 2/2018 |
| CN | 107823882 A | 3/2018 |
| CN | 107913520 A | 4/2018 |
| CN | 108196765 A | 6/2018 |
| CN | 109568957 A | 4/2019 |

* cited by examiner

IN-GAME DISPLAY CONTROL METHOD AND APPARATUS, STORAGE MEDIUM PROCESSOR, AND TERMINAL

CROSS-REFERENCE TO RELATED APPLICATIONS

The present disclosure claims priority of Chinese Patent Application No. 201910024151.3, filed to China Patent Office on Oct. 1, 2019. Contents of the present disclosure are hereby incorporated by reference in entirety of the Chinese Patent Application.

TECHNICAL FIELD

The present disclosure relates to the field of computers, and in particular to an in-game display control method and apparatus, a storage medium, a processor, and a terminal.

BACKGROUND

At present, in mainstream Multiplayer Online Battle Arena (MOBA) mobile games, game scenes are usually observed by a basic manner of fixed lens and lens dragging. In addition, some games will carry out targeted lens interaction design for a few specific types of heroic characters based on the basic manner of fixed lens and lens dragging. Or, some games will also carry out supplementary design in terms of specific lenses. For example, game players may manually switch a lens height mode.

The fixed lens means that a center of the lens is fixed on the body of a game character model by default, and a height of the lens is a fixed value by default. A game player may move a camera by clicking and dragging on a specific area of a screen, and a drag speed of the camera is different in different types of games. In some MOBA mobile games, the longest drag distance may reach ¼ of the maximum battlefield length. In another part of the MOBA mobile games, the longest drag distance may reach almost the entire battlefield.

In addition, when a game player clicks on a mini map in a user interface, the camera will be immediately moved to the clicked position; and when the game player continuously performs a dragging operation after performing the clicking operation, the camera will also follow the movement until the game player releases the hand, and the camera will automatically return to an initial position of this camera.

However, in the current MOBA mobile games on the market, due to limitation of a two-handed interaction mode, most of the games use a fixed lens and lens dragging solution to meet demands of game players for battlefield horizon and lens operations. However, according to the above analysis, it can be known that this solution combining a fixed lens and an active dragging lens can meet the most basic functional requirements, lacks favorable adaptability and scalability for special situations and operations that occur in the game, and cannot meet game experience needs of game players at different levels.

As to the problem mentioned above, no effective solution has been provided yet.

SUMMARY

At least some embodiments of the present disclosure provide an in-game display control method and apparatus, a storage medium, a processor, and a terminal, so as to at least partially solve a technical problem that an adjustment mode of an in-game virtual lens provided in the related art has a single operation mode, lacks favorable adaptability and scalability, and cannot meet the game experience requirements of game players at different levels.

In an embodiment of the present disclosure, an in-game display control method is provided. This method is applied to a mobile terminal having at least one processor for executing a software application and a touch screen which is rendered with a graphical user interface. A game scene of a game may include a first virtual character and a scene display area. The scene display area may be at least part of the game scene. Contents rendered on the graphical user interface may include the scene display area. The method may include that:

a first touch operation acting on a preset area of the graphical user interface is detected; the scene display area is updated according to the first touch operation; a second touch operation acting on a skill control of the graphical user interface is detected, and the skill control corresponds to a skill of a first virtual character; a release direction of the skill is controlled according to the second touch operation; and when the first touch operation and the second touch operation are detected at least partially overlap in timing, a focus position is determined in the release direction, and the scene display area in the game scene is updated according to the focus position in the release direction.

Optionally, the operation that the focus position is determined in the release direction may include that: when a release track of the skill passes through the scene display area, the focus position is determined in the release track along the release direction.

Optionally, when the release track of the skill passes through the scene display area, the method may further include that: responding to the first touch operation is prohibited.

Optionally, the operation that the first touch operation and the second touch operation are detected at least partially overlap in timing may include that: the second touch operation is detected in a process of updating the scene display area in the game scene according to the first touch operation; or, the first touch operation is detected in a process of adjusting the release direction of the skill according to the second touch operation.

Optionally, a virtual camera corresponding to the first virtual character may be provided in the game scene, and the scene display area in the game scene may be an area shot by the virtual camera.

Optionally, the operation that the scene display area is updated according to the first touch operation may include that: a movement of the virtual camera is controlled according to a movement track of a touch point of the first touch operation; and the scene display area is updated according to the movement of the virtual camera.

Optionally, the operation that the scene display area is updated according to the focus position may include that: an operation state of a touch point of the second touch operation is detected; when determining that a rest time period of the touch point exceeds a preset threshold according to the operation state, the virtual camera is controlled to move from a current position to the focus position at a preset speed; and the scene display area is updated according to the movement of the virtual camera.

Optionally, the operation that the scene display area is updated according to the focus position may include that: the release direction is adjusted according to the second touch operation; when a skill release track along the release direction passes through a specific area in the scene display area, the focus position is determined according to the skill release track; and the scene display area is updated according to the focus position.

Optionally, the operation that the scene display area is updated according to the focus position may include that: a specific position of a specific event or a second virtual character within a preset area of the focus position is acquired; and the update of the scene display area in the game scene is adjusted according to the specific position and the focus position.

Optionally, the operation that the update of the scene display area in the game scene is adjusted according to the specific position and the focus position may include that: the scene display area in the game scene is adjusted with a preset sensitivity according to the specific position and the focus position.

In another embodiment of the present disclosure, an in-game display control apparatus is also provided. This apparatus is applied to a mobile terminal having at least one processor for executing a software application and a touch screen which is rendered with a graphical user interface. A game scene of a game may include a first virtual character and a scene display area. The scene display area may be at least part of the game scene. Contents rendered on the graphical user interface may include the scene display area. The apparatus may include: a first detection component, configured to detect a first touch operation acting on a preset area of the graphical user interface; a first update component, configured to update the scene display area according to the first touch operation; a second detection component, configured to detect a second touch operation acting on a skill control of the graphical user interface, and the skill control corresponds to a skill of a first virtual character; a control component, configured to control a release direction of the skill according to the second touch operation; and a second update component, configured to, when the first touch operation and the second touch operation are detected at least partially overlap in timing, determine a focus position in the release direction, and update the scene display area in the game scene according to the focus position in the release direction.

Optionally, the second update component may be configured to, when a release track of the skill passes through the scene display area, determine the focus position in the release track along the release direction.

Optionally, the apparatus may further include: a processing component, configured to prohibit responding to the first touch operation.

Optionally, the apparatus may further include: a third detection component, configured to detect the second touch operation in a process of updating the scene display area in the game scene according to the first touch operation; or, detect the first touch operation in a process of adjusting the release direction of the skill according to the second touch operation.

Optionally, a virtual camera corresponding to the first virtual character may be provided in the game scene, and the scene display area in the game scene may be an area shot by the virtual camera.

Optionally, the first update component may include: a first control element, configured to control a movement of the virtual camera according to a movement track of a touch point of the first touch operation; and a first update element, configured to update the scene display area according to the movement of the virtual camera.

Optionally, the second update component may include: a detection element, configured to detect an operation state of a touch point of the second touch operation; a second control element, configured to, when determining that a rest time period of the touch point exceeds a preset threshold according to the operation state, control the virtual camera to move from a current position to the focus position at a preset speed; and a second update element, configured to update the scene display area according to the movement of the virtual camera.

Optionally, the second update component may include: a first adjustment element, configured to adjust the release direction according to the second touch operation; a determination element, configured to, when a skill release track along the release direction passes through a specific area in the scene display area, determine the focus position according to the skill release track; and a third update element, configured to update the scene display area according to the focus position.

Optionally, the second update component may include: an acquisition element, configured to acquire a specific position of a specific event or a second virtual character within a preset area of the focus position; and a fourth update element, configured to adjust the update of the scene display area in the game scene according to the specific position and the focus position.

Optionally, the fourth update element may be configured to adjust the scene display area in the game scene with a preset sensitivity according to the specific position and the focus position.

In another embodiment of the present disclosure, a storage medium is also provided, which may include a stored program. When the stored program is run, a device where the storage medium is located may be controlled to perform the in-game display control method as mentioned above.

In another embodiment of the present disclosure, a processor is also provided. The processor may be configured to run a program. When the program is run, the in-game display control method as mentioned above may be performed.

In another embodiment of the present disclosure, a terminal is also provided. The terminal may include at least one processor, a memory, a display device and at least one program. The at least one program may be stored in the memory, and configured to be executed by the at least one processor. The at least one processor may be configured to perform the in-game display control method as mentioned above.

In at least some embodiments of the present disclosure, the first touch operation acting on the preset area of the graphical user interface is detected, the scene display area is updated according to the first touch operation, a second touch operation acting on the skill control of the graphical user interface is detected, the release direction of the skill is controlled according to the second touch operation, and when the first touch operation and the second touch operation are detected at least partially overlap in timing, the focus position is determined in the release direction so as to update the scene display area in the game scene according to the focus position in the release direction, thereby achieving an aim of assisting in release of a long-distance skill. Therefore, the technical effect of realizing an intelligent scene display area adjustment mode to make the scene display area adjustment mode more flexible and intelligent, thereby solving the technical problem that the adjustment mode of the in-game virtual lens provided in the related art has the single operation mode, lacks favorable adaptability and scalability, and cannot meet the game experience requirements of game players at different levels.

BRIEF DESCRIPTION OF THE DRAWINGS

The accompanying drawings described herein are used for providing a further understanding of the present disclosure, and constitute a part of the present application, and the exemplary embodiments of the present disclosure and the description thereof are used for explaining the present disclosure, but do not constitute improper limitations to the present disclosure. In the drawings.

DETAILED DESCRIPTION

Figure 1:
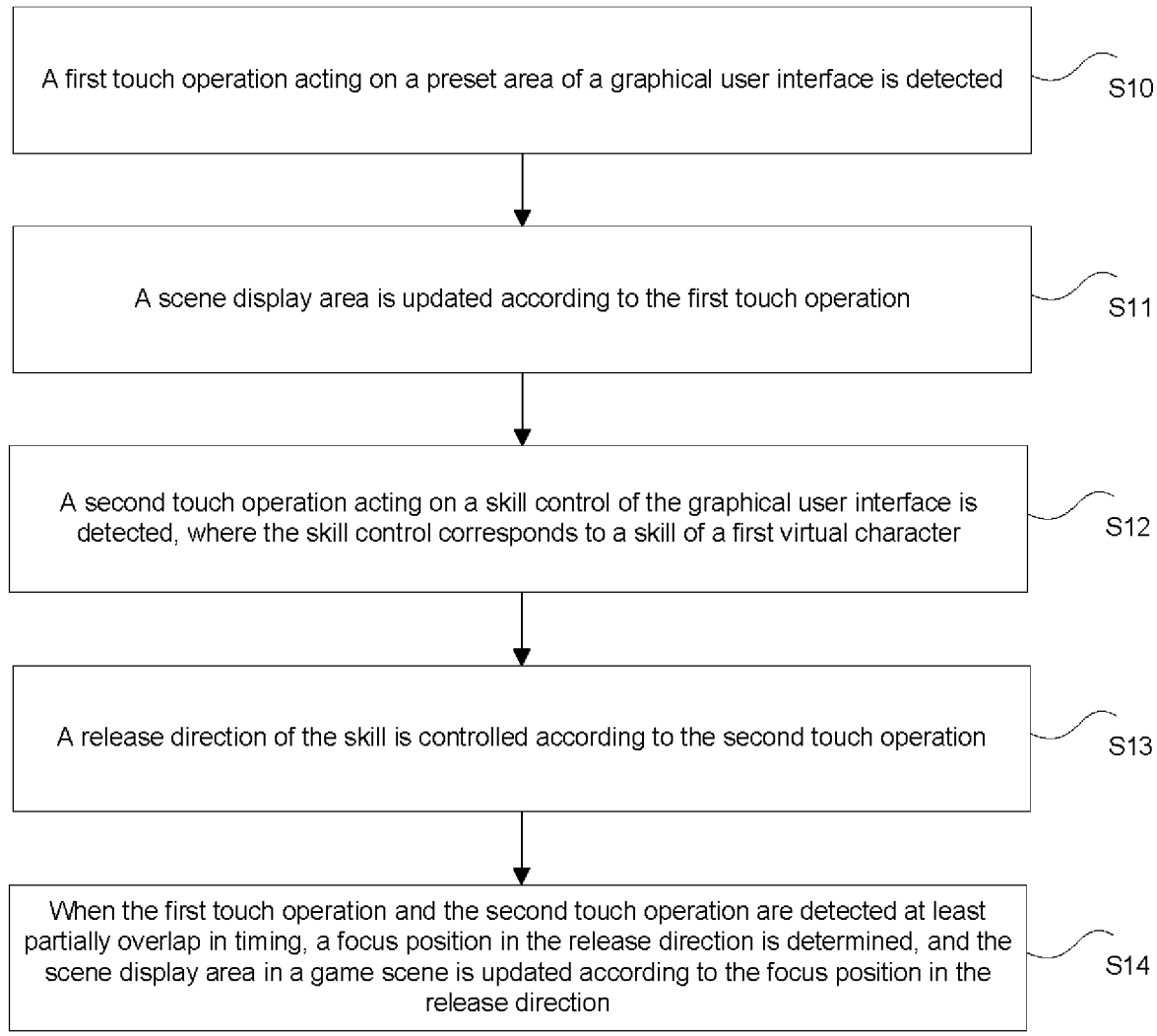
FIG. 1 is a flowchart of an in-game display control method according to an embodiment of the present disclosure.

In order to make those skilled in the art better understand the solutions of the present disclosure, technical solutions in embodiments of the present disclosure will be clearly and completely described below with reference to the drawings in the embodiments of the present disclosure. It is apparent that the described embodiments are a part of the embodiments of the present disclosure, not all of the embodiments. On the basis of the embodiments of the present disclosure, all other embodiments obtained on the premise of no creative work of those of ordinary skill in the art should fall within the scope of protection of the present disclosure.

It is to be noted that the specification and claims of the disclosure and the terms "first", "second" and the like in the drawings are used for distinguishing similar objects, and do not need to describe a specific sequence or a precedence order. It will be appreciated that data used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

In an embodiment of the present disclosure, an in-game display control method is provided. It is to be noted that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

The method embodiment may be implemented in a mobile terminal, a computer terminal or a similar computing device. Running on the mobile terminal is taken as an example. The mobile terminal may include at least one processor (the at least one processor may include but is not limited to a processing device such as a Central Processing Unit (CPU), a Graphics Processing Unit (GPU), a Digital Signal Processing (DSP) chip, a Micro Controller Unit (MCU) or a Field Programmable Gate Array (FPGA)) and a memory configured to store data. Optionally, the mobile terminal may further include a transmission apparatus and an input/output device for communication functions. Those skilled in the art can understand that the above structural description is illustrative, and does not limit the structure of the above mobile terminal. For example, the mobile terminal may further include more or less components than those described in the above structural description, or have a configuration different from that described above.

The memory may be configured to store a computer program, for example, a software program and component of application software, such as a computer program corresponding to the in-game display control method in the embodiment of the present disclosure, and the processor executes various functional applications and data processing by running the computer program stored in the memory, that is, implements the above in-game display control method. The memory may include a high speed random access memory and may also include a non-volatile memory such as at least one magnetic storage device, a flash memory, or other non-volatile solid state memories. In some examples, the memory may further include memories remotely located relative to the processor, which may be connected to the mobile terminal over a network. The examples of such networks include, but are not limited to, the Internet, the Intranet, local area networks, mobile communication networks, and combinations thereof.

The transmission device is configured to receive or send data via a network. The above specific network example may include a wireless network provided by a communication provider of the mobile terminal. In one example, the transmission device includes a Network Interface Controller (NIC) that may be connected to other network devices through a base station to communicate with the Internet. In one example, the transmission device may be a Radio Frequency (RF) component for communicating with the Internet wirelessly.

In the present embodiment, an in-game display control method running on the above mobile terminal is provided. This method is applied to a mobile terminal having at least one processor for executing a software application and a touch screen which is rendered with a graphical user interface. A game scene of a game includes a first virtual character and a scene display area. The scene display area is at least part of the game scene. Contents rendered on the graphical user interface include the scene display area. FIG. 1 is a flowchart of an in-game display control method according to an embodiment of the present disclosure. As shown in FIG. 1, the method includes the following steps.

At step S10, a first touch operation acting on a preset area of a graphical user interface is detected.

At step S11, a scene display area is updated according to the first touch operation.

At step S12, a second touch operation acting on a skill control of the graphical user interface is detected, and the skill control corresponds to a skill of a first virtual character.

At step S13, a release direction of the skill is controlled according to the second touch operation.

At step S14, when the first touch operation and the second touch operation are detected at least partially overlap in timing, a focus position is determined in the release direction, and the scene display area in the game scene is updated according to the focus position in the release direction.

By means of the above steps, the first touch operation acting on the preset area of the graphical user interface is detected, the scene display area is updated according to the first touch operation, a second touch operation acting on the skill control of the graphical user interface is detected, the release direction of the skill is controlled according to the second touch operation, and when the first touch operation and the second touch operation are detected at least partially overlap in timing, the focus position is determined in the release direction so as to update the scene display area in the game scene according to the focus position in the release direction, thereby achieving an aim of assisting in release of a long-distance skill. Therefore, the technical effect of realizing an intelligent scene display area adjustment mode to make the scene display area adjustment mode more flexible and intelligent, thereby solving the technical problem that the adjustment mode of the in-game virtual lens provided in the related art has the single operation mode, lacks favorable adaptability and scalability, and cannot meet the game experience requirements of game players at different levels.

It is to be noted that there is no strict sequence between steps S10-S11 and steps S12-S13 in timing. That is, the first touch operation may be performed before or after the second touch operation, and the first touch operation and the second touch operation may be performed simultaneously. As long as the first touch operation and the second touch operation at least partially overlap in timing, the first touch operation and the second touch operation may be applied to the technical solutions provided by the embodiments of the present disclosure.

The preset area may be a mini map on the graphical user interface or a horizon adjustment area on the graphical user interface. The following will take the preset area as the mini map for illustration, and the implementation process is also applicable to the horizon adjustment area.

For the release of directional ultra-long-distance skills (for example, this skill release area covers the entire game scene), the game player may hold down (equivalent to the above second touch operation) the skill control to adjust the skill release direction. In addition, the game player may also click or slide (equivalent to the above first touch operation) the mini map to update the scene display area. When the first touch operation and the second touch operation are detected at least partially overlap in timing, a focus position (for example, a geometric center of the graphical user interface) may be determined in the release direction. And when the game player adjusts the release direction through the second touch operation, the focus position will be changed accordingly and the scene display area in the game scene is updated through the change of the focus position.

When releasing ultra-long-area skills in the related art, the skill release direction and skill release trajectory may be displayed in the scene display area corresponding to a current horizon area of the first virtual character, and the skill release track beyond the scene display area corresponding to the current horizon area is invisible, which results in that a target cannot be hit due to a deviation from a specific event or an enemy virtual character. Conversely, in the technical solution provided by this embodiment of the present disclosure, the focus position is determined in a release direction directed by a skill indicator, and with the movement of the skill indicator, the focus position will also move accordingly. Therefore, according to the focus position in the release direction, the scene display area in the game scene is updated, and the specific event or enemy virtual character is accurately located through the movement of the focus position, in order to complete precise release of ultra-long-distance skills.

Optionally, at step S14, the operation that the focus position is determined in the release direction may include the following execution steps.

At step S140, when a release track of the skill passes through the scene display area, the focus position is determined in the release track along the release direction.

After detecting the click operation of the game player acting on the mini map and updating the scene display area, and detecting the click operation of the game player acting on the remote skill control and controlling the release direction of the skill, when the release track of the skill is determined to pass through the scene display area, the focus position may be determined in the release track along the release direction. The focus position may be any position in the release track in the scene display area. In an optional embodiment of the present disclosure, the focus position is a geometric center position in the release track in the scene display area.

Optionally, at step S14, when the release track of the skill passes through the scene display area, the method may further include the following execution step.

At step S15, responding to the first touch operation is prohibited.

When the release track of the skill passes through the scene display area, since the scene display area in the game scene is updated according to the focus position in the release direction, the touch operation performed by the game player in the mini map will not be responded, the scene display area cannot be updated. That is, the touch operation in the mini map is invalid. Only when the game player cancels the skill release operation, the touch operation acting on the mini map may take effect again. That is, the scene display area is updated by the first touch operation. After the scene display area is updated through the first touch operation, when the game player cancels the touch operation in the mini map, the scene display area may be restored to a display state before the game player performs the first touch operation and the second touch operation.

Optionally, at step S14, the operation that the first touch operation and the second touch operation are detected at least partially overlap in timing may be implemented by one of the following manners.

In the first manner, the second touch operation is detected in a process of updating the scene display area in the game scene according to the first touch operation.

That is, to release the directional long-area attack skill, the game player usually performs a click operation on the mini map to determine the release direction. In view of this, the game player needs to find an attack object (for example, an enemy residual blood virtual character) in the mini map, and then click the skill control, thereby generating the first touch operation and the second touch operation at least partially overlapping in timing.

In the second manner, the first touch operation is detected in a process of adjusting the release direction of the skill according to the second touch operation.

That is, the game player may also determine an approximate release direction by clicking on the skill control based on experience or game proficiency, and then perform a click operation on the mini map to confirm whether the release direction can be aimed at the enemy virtual character, thereby generating the first touch operation and the second touch operation at least partially overlapping in timing.

Optionally, a virtual camera corresponding to the first virtual character is provided in the game scene, and the scene display area in the game scene is an area shot by the virtual camera.

In an optional embodiment, the virtual camera may be fixed on the first virtual character controlled by the game player, move according to the movement of the virtual character, and rotate according to the rotation of the virtual character, which is similar to a subjective perspective of the virtual character. Therefore, the scene display area in the game scene is an area shot by the virtual camera. Of course, the virtual camera may also be set at a position relative to the first virtual character controlled by the game player, for example, set at a preset position above the first virtual character and follow the virtual character to move, which is similar to a third party's perspective of the virtual character. Therefore, the scene display area in the game scene is an area shot by the virtual camera. The following optional embodiments mainly take a virtual camera fixed at a relative position of a virtual character controlled by a game player as an example for detailed description. The implementation process is also applicable to setting a virtual camera on a virtual character controlled by a game player.

Optionally, at step S11, the operation that a scene display area is updated according to the first touch operation may include the following execution steps.

At step S111, a movement of the virtual camera is controlled according to a movement track of a touch point of the first touch operation.

At step S112, the scene display area is updated according to the movement of the virtual camera.

During a drag or slide operation (equivalent to the above first touch operation) performed by the game player on the mini map, a corresponding movement track is generated. The movement track is a set of touch points generated by the first touch operation at serial time points and at different positions. In view of a preset mapping relationship among a displacement change of the touch point, a movement speed of the virtual camera and a update sensitivity of the scene display area, the displacement change of the touch point may be determined according to the movement track of the touch point, the virtual camera is controlled to move at a preset speed according to the mapping relationship, and the update sensitivity is determined according to the mapping relationship, so as to adjust the update speed of the scene display area according to the update sensitivity. The above displacement change may be obtained by calculating a displacement change between two adjacent frames of images, or obtained by calculating a displacement change between a starting touch point and an ending touch point of the movement track.

Optionally, at step S14, the operation that a scene display area is updated according to the focus position may include the following execution steps.

At step S141, an operation state of a touch point of the second touch operation is detected.

At step S142, when determining that a rest time period of the touch point exceeds a preset threshold according to the operation state, the virtual camera is controlled to move from a current position to the focus position at a preset speed.

At step S143, the scene display area is updated according to the movement of the virtual camera.

During the process of controlling the release direction of the skill by the game player by performing the second touch operation, due to the influence of specific factors (for example, the game player is unable to operate normally due to interference by external factors, and the game is stuck), the touch point of the second touch operation on the skill control is in a stationary state and the rest time period exceeds a preset threshold. Therefore, the mobile terminal may control the virtual camera to move from the current position (for example, the geometric center position of the scene display area) to the focus position at a preset speed, and with the movement from the current position to the focus position, the scene display area is automatically updated.

Optionally, at step S14, the operation that a scene display area is updated according to the focus position may include the following execution steps.

At step S144, the release direction is adjusted according to the second touch operation.

At step S145, when a skill release track along the release direction passes through a specific area in the scene display area, the focus position is determined according to the skill release track.

At step S146, the scene display area is updated according to the focus position.

The specific area may be any area in the entire horizon adjustment area in the graphical user interface. In an optional embodiment, the specific area is a center zone of a current scene display area. The game player may adjust the release direction of the skill by clicking or dragging the skill control. If the skill release track is displayed in the current scene display area and the skill release track passes through the current position of the virtual camera (that is, the skill release track passes through the center zone of the current scene display area), the focus position may be determined according to the skill release track, so as to update the scene display area.

Optionally, at step S14, the operation that a scene display area is updated according to the focus position may include the following execution steps.

At step S147, a specific position of a specific event or a second virtual character within a preset area of the focus position is acquired.

At step S148, the update of the scene display area in the game scene is adjusted according to the specific position and the focus position.

The second virtual character may be an enemy virtual character. The above specific event may be an event that has an important impact on a progress of the game, such as team battles, residual blood hunting, rescue, and hunting of important monsters. After the specific event is determined, a specific area may be generated around the position where the specific event occurs, which may be the smallest circle covering all the virtual characters participating in the specific event.

In an optional embodiment, the scene display area in the game scene may be adjusted with a preset sensitivity according to the specific position and the focus position. When a specific event or a second virtual character does not exist in the preset area of the focus position, according to the mapping relationship between the displacement change of the focus position and a first sensitivity, the update speed of the scene display area may be adjusted according to the first sensitivity. When a specific event or a second virtual character exists within a preset area of the focus position, the focus position may be adjusted so that the release direction of the skill directs to the specific position, thereby generating the displacement change of the focus position. Then, according to the mapping relationship between the displacement change of the focus position and a second sensitivity, the update speed of the scene display area may be adjusted according to the second sensitivity. That is, the update speed of the scene display area in the release direction in the game scene is increased. The above displacement change may be obtained by calculating a displacement change between two adjacent frames of images, or obtained by calculating a displacement change between a starting position and an ending position of the focus position during a movement of the focus position.

Figure 2:
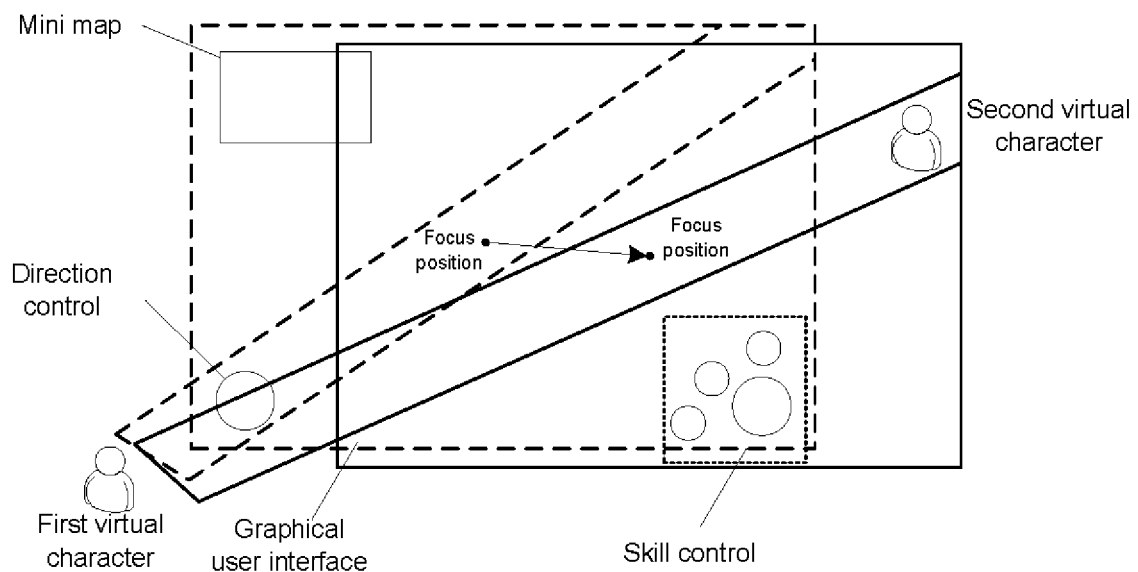
FIG. 2 is a flowchart of an in-game display control method according to an optional embodiment of the present disclosure.

FIG. 2 is a flowchart of an in-game display control method according to an optional embodiment of the present disclosure. As shown in FIG. 2, when a second virtual character exists within a preset area of the focus position, the focus position may be adjusted so that the release direction of the skill directs to the specific position where the second virtual character is located, thereby generating the displacement change of the focus position. Then, according to the mapping relationship between the displacement change of the focus position and the second sensitivity, the update speed of the scene display area in the release direction of the game scene is increased.

By combining the foregoing embodiments, the following technical effects can be achieved.

At one, a comprehensive optimization of the current mainstream lens solutions has made up for shortcomings of fixed and rigid lens modes in the current mainstream MOBA mobile game lens solutions and reliance on frequent operations by game players, which makes the operation of game lenses more flexible and intelligent. In addition, it has favorable extensibility, and leaves more design space for changes such as new gameplay methods and new characters to make the lens solution of the game more diversified and customized.

At two, for intelligent lens adjustment modes, according to differences of operating behaviors of game players and game situations where the game players are located, different ways of lens assistance are provided to meet the special needs of a game horizon, the fine adjustment operation of the lens is intelligentized, the operation burdens of the game players are reduced, and the game players can obtain current game information needed most in the most relaxed way, thereby improving the efficiency of game information transmission and providing the game players with a smoother game experience.

At three, game players and novice players with limited operation levels who are unable to use lens operations and receive battlefield information well can adapt to the game faster, and master game lens operation methods, and an intelligent solution is provided for a special lens operation, thereby reducing the learning cost of the game players, lowering the overall operation threshold of the game, and improving the coverage area of the corresponding user group of the game.

At four, the game players with high operation level are enabled to complete more fine game operations with the most convenient operations, thereby providing more room for improvement in the game skills of such game players, improving the game experience of such game players, and facilitating the retention of garners at this level.

At five, as an overall optimization solution, it can adapt to the needs of game players at different levels and provide favorable conditions for overall promotion and propagation of the game.

Through the description of the above implementation modes, those skilled in the art can clearly understand that the method according to the above embodiment may be implemented by means of software plus a necessary general hardware platform, and of course, may also be implemented through hardware, but in many cases, the former is a better implementation manner. Based on such understanding, the technical solution of the present disclosure, which is essential or contributes to the conventional art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure.

In the present embodiment, an in-game display control apparatus is further provided, which is configured to implement the above embodiments and exemplary implementation manners, and the description thereof has been omitted. As used below, the term "component" may implement a combination of software and/or hardware of a predetermined function. Although the apparatus described in the following embodiments is optionally implemented by software, hardware or a combination of software and hardware is also possible and conceived.

Figure 3:
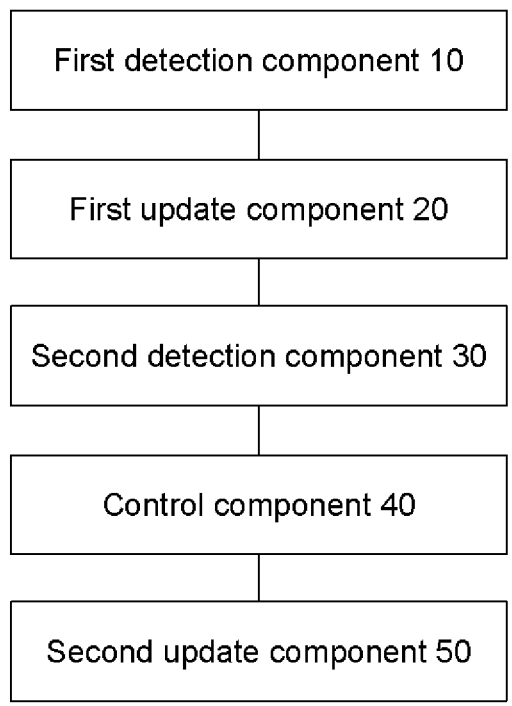
FIG. 3 is a structural block diagram of an in-game display control apparatus according to an embodiment of the present disclosure.

FIG. 3 is a structural block diagram of an in-game display control apparatus according to an embodiment of the present disclosure. As shown in FIG. 3, this apparatus is applied to a mobile terminal having at least one processor for executing a software application and a touch screen which is rendered with a graphical user interface, a game scene of a game includes a first virtual character and a scene display area, the scene display area is at least part of the game scene, and contents rendered on the graphical user interface includes the scene display area. The apparatus includes: a first detection component 10, configured to detect a first touch operation acting on a preset area of the graphical user interface; a first update component 20, configured to update the scene display area according to the first touch operation; a second detection component 30, configured to detect a second touch operation acting on a skill control of the graphical user interface, where the skill control corresponds to a skill of a first virtual character; a control component 40, configured to control a release direction of the skill according to the second touch operation; and a second update component 50, configured to, when the first touch operation and the second touch operation are detected at least partially overlap in timing, determine a focus position in the release direction, and update the scene display area in the game scene according to the focus position in the release direction.

Optionally, the second update component 50 is configured to, when a release track of the skill passes through the scene display area, determine the focus position in the release track along the release direction.

Figure 4:
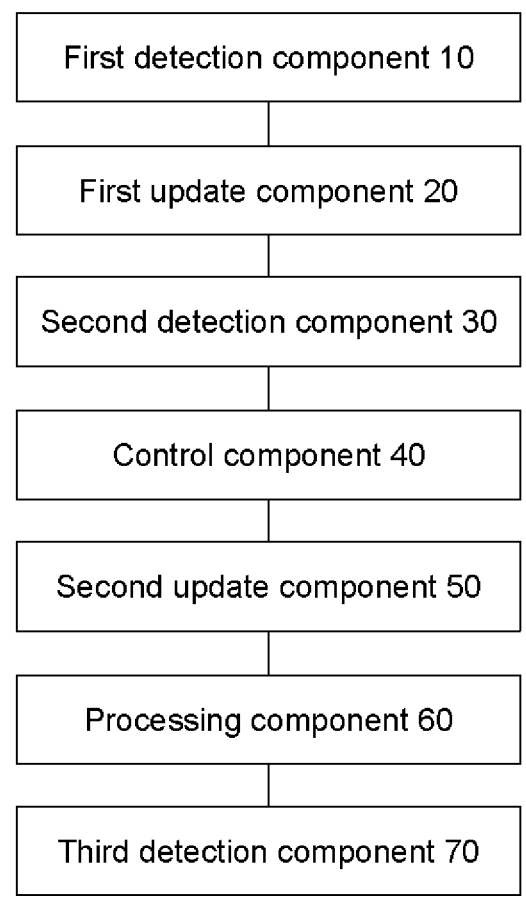
FIG. 4 is a structural block diagram of an in-game display control apparatus according to an optional embodiment of the present disclosure.

Optionally, FIG. 4 is a structural block diagram of an in-game display control apparatus according to an optional embodiment of the present disclosure. As shown in FIG. 4, the apparatus includes, in addition to all the components shown in FIG. 3, a processing component 60, configured to prohibit responding to the first touch operation.

Optionally, as shown in FIG. 4, the apparatus further includes: a third detection component 70, configured to detect the second touch operation in a process of updating the scene display area in the game scene according to the first touch operation; or, detect the first touch operation in a process of adjusting the release direction of the skill according to the second touch operation.

Optionally, a virtual camera corresponding to the first virtual character is provided in the game scene, and the scene display area in the game scene is an area shot by the virtual camera.

Optionally, the first update component 20 includes: a first control element (not shown in the figure), configured to control a movement of the virtual camera according to a movement track of a touch point of the first touch operation; and a first update element (not shown in the figure), configured to update the scene display area according to the movement of the virtual camera.

Optionally, the second update component 50 includes: a detection element (not shown in the figure), configured to detect an operation state of a touch point of the second touch operation; a second control element (not shown in the figure), configured to, when detecting that a rest time period of the touch point exceeds a preset threshold according to the operation state, control the virtual camera to move from a current position to the focus position at a preset speed; and a second update element (not shown in the figure), configured to update the scene display area according to the movement of the virtual camera.

Optionally, the second update component 50 includes: a first adjustment element (not shown in the figure), configured to adjust the release direction according to the second touch operation; a determination element (not shown in the figure), configured to, when a skill release track along the release direction passes through a specific area in the scene display area, determine the focus position according to the skill release track; and a third update element (not shown in the figure), configured to update the scene display area according to the focus position.

Optionally, the second update component 50 includes: an acquisition element (not shown in the figure), configured to acquire a specific position of a specific event or a second virtual character within a preset area of the focus position; and a fourth update element (not shown in the figure), configured to adjust the update of the scene display area in the game scene according to the specific position and the focus position.

Optionally, the fourth update element (not shown in the figure) is configured to adjust the scene display area in the game scene with a preset sensitivity according to the specific position and the focus position.

It is to be noted that each of the above components may be implemented by software or hardware. The latter may be implemented by, but not limited to, the following manners: the above components are all located in the same processor; or, the above components are located in different processors respectively in any combined form.

Another embodiment of the present disclosure further provides a storage medium. The storage medium stores a computer program, where the computer program is configured to perform the steps in any one of the above method embodiments during running.

Optionally, in the present embodiment, the storage medium may be configured to store the computer program for performing the following steps.

At step S1, a first touch operation acting on a preset area of a graphical user interface is detected.

At step S2, a scene display area is updated according to the first touch operation.

At step S3, a second touch operation acting on a skill control of the graphical user interface is detected, and the skill control corresponds to a skill of a first virtual character.

At step S4, a release direction of the skill is controlled according to the second touch operation.

At step S5, when the first touch operation and the second touch operation are detected at least partially overlap in timing, a focus position is determined in the release direction, and the scene display area in the game scene is updated according to the focus position in the release direction.

Optionally, in the present embodiment, the storage medium may include, but is not limited to, various media capable of storing a computer program such as a U disk, a Read-Only Memory (ROM), a Random Access Memory (RAM), a mobile hard disk, a magnetic disk or an optical disc.

Another embodiment of the present disclosure further provides a processor. The processor is configured to run a computer program to perform the steps in any one of the above method embodiments.

Optionally, in the present embodiment, the processor may be configured to perform the following steps through the computer program.

At step S1, a first touch operation acting on a preset area of a graphical user interface is detected.

At step S2, a scene display area is updated according to the first touch operation.

At step S3, a second touch operation acting on a skill control of the graphical user interface is detected, where the skill control corresponds to a skill of a first virtual character.

At step S4, a release direction of the skill is controlled according to the second touch operation.

At step S5, when the first touch operation and the second touch operation are detected at least partially overlap in timing, a focus position is determined in the release direction, and the scene display area in the game scene is updated according to the focus position in the release direction.

The above serial numbers of the embodiments of the present disclosure are for the description, and do not represent the advantages and disadvantages of the embodiments.

In the above embodiments of the present disclosure, descriptions of each embodiment are emphasized respectively, and parts which are not elaborated in detail in a certain embodiment may refer to relevant descriptions of other embodiments.

In several embodiments provided by the present application, it is to be understood that the disclosed technical content may be implemented in other manners. The device embodiments described above are merely illustrative. For example, the division of the element may be a logical function division. In actual implementation, there may be another division manner, for example, multiple elements or components may be combined or integrated into another system, or some features may be ignored or not executed. In addition, the coupling or direct coupling or communication connection shown or discussed may be an indirect coupling or communication connection through some interfaces, elements or components, and may be electrical or otherwise.

The elements described as separate components may or may not be physically separated, and the members displayed as elements may or may not be physical elements, that is, may be located in one place, or may be distributed to multiple elements. Some or all of the elements may be selected according to actual needs to achieve the purpose of the solution of the present embodiment.

In addition, each functional element in each embodiment of the present disclosure may be integrated into one processing element, or each element may exist physically separately, or at least two elements may be integrated into one element. The integrated element may be implemented in a hardware form and may also be implemented in form of software functional element.

The integrated element may be stored in a computer-readable storage medium when being implemented in the form of a software functional element and sold or used as a standalone product. Based on such understanding, the technical solution of the present disclosure, which is essential or contributes to the related art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure. The foregoing storage medium includes: a U disk, a ROM, a RAM, a mobile hard disk, a magnetic disk, or an optical disk, and the like, which may store a program code.

The above are exemplary implementations of the present disclosure. It is to be noted that a number of modifications and refinements may be made by those of ordinary skill in the art without departing from the principles of the present disclosure, and such modifications and refinements are also considered to be within the scope of protection of the present disclosure.

What is claimed is:

1. An in-game display control method, applied to a mobile terminal having at least one processor for executing a software application and a touch screen which is rendered with a graphical user interface, a game scene of a game comprising a first virtual character and a scene display area, the scene display area being at least part of the game scene, contents rendered on the graphical user interface comprising the scene display area, the method comprising:
   detecting a first touch operation acting on a preset area of the graphical user interface, wherein the preset area is a mini map on the graphical user interface or a horizon adjustment area on the graphical user interface;
   updating the scene display area according to the first touch operation;
   detecting a second touch operation acting on a skill control of the graphical user interface, wherein the skill control corresponds to a skill of a first virtual character;
   controlling a release direction of the skill according to the second touch operation;
   when the first touch operation and the second touch operation are detected at least partially overlap in timing, determining a focus position in the release direction, and updating the scene display area in the game scene according to the focus position in the release direction;
   wherein a virtual camera corresponding to the first virtual character is provided in the game scene, and the scene display area in the game scene is an area shot by the virtual camera;
   wherein updating the scene display area according to the first touch operation comprises:
   controlling a movement of the virtual camera according to a movement track of a touch point of the first touch operation; and updating the scene display area according to the movement of the virtual camera;
   wherein updating the scene display area according to the focus position comprises:
   detecting an operation state of a touch point of the second touch operation; when determining that a rest time period of the touch point exceeds a preset threshold according to the operation state, controlling the virtual camera to move from a current position to the focus position at a preset speed; and updating the scene display area according to the movement of the virtual camera.

2. The method as claimed in claim 1, wherein determining the focus position in the release direction comprises:
   when a release track of the skill passes through the scene display area, determining the focus position in the release track along the release direction.

3. The method as claimed in claim 2, wherein when the release track of the skill passes through the scene display area, the method further comprises: prohibiting responding to the first touch operation.

4. The method as claimed in claim 2, wherein the focus position is any position in a release track in the scene display area.

5. The method as claimed in claim 1, wherein detecting that the first touch operation and the second touch operation at least partially overlap in timing comprises:
   detecting the second touch operation in a process of updating the scene display area in the game scene according to the first touch operation; or,
   detecting the first touch operation in a process of adjusting the release direction of the skill according to the second touch operation.

6. The method as claimed in claim 1 wherein updating the scene display area according to the focus position comprises:
   adjusting the release direction according to the second touch operation;
   when a skill release track along the release direction passes through a specific area in the scene display area, determining the focus position according to the skill release track; and
   updating the scene display area according to the focus position.

7. The method as claimed in claim 1, wherein updating the scene display area according to the focus position comprises:
   acquiring a specific position of a specific event or a second virtual character within a preset area of the focus position; and
   adjusting the update of the scene display area in the game scene according to the specific position and the focus position.

8. The method as claimed in claim 7, wherein adjusting the update of the scene display area in the game scene according to the specific position and the focus position comprises:
   adjusting the scene display area in the game scene with a preset sensitivity according to the specific position and the focus position.

9. The method as claimed in claim 7, wherein when a specific event or a second virtual character does not exist in the preset area of the focus position, according to a mapping relationship between a displacement change of the focus position and a first sensitivity, a update speed of the scene display area is adjusted according to the first sensitivity.

10. The method as claimed in claim 7, wherein when a specific event or a second virtual character exists within a preset area of the focus position, the focus position is adjusted so that the release direction of the skill directs to the specific position, and according to a mapping relationship between a displacement change of the focus position and a second sensitivity, the update speed of the scene display area is adjusted according to the second sensitivity.

11. The method as claimed in claim 1, wherein when the release direction is adjusted according to the second touch operation, the focus position is changed accordingly and the scene display area in the game scene is updated through the change of the focus position.

12. The method as claimed in claim 1, wherein based on a preset mapping relationship among a displacement change of the touch point, a movement speed of the virtual camera and a update sensitivity of the scene display area, a displacement change of the touch point is determined according to the movement track of the touch point, the virtual camera is controlled to move at a preset speed according to the mapping relationship, and the update sensitivity is determined according to the mapping relationship, so as to adjust the update speed of the scene display area according to the update sensitivity.

13. A non-transitory storage medium, comprising a stored program, wherein when the stored program is run, a device where the storage medium is located is controlled to perform an in-game display control method, the in-game display control method comprises:

detecting a first touch operation acting on a preset area of a graphical user interface, wherein the preset area is a mini map on the graphical user interface or a horizon adjustment area on the graphical user interface;

updating a scene display area according to the first touch operation;

detecting a second touch operation acting on a skill control of the graphical user interface, wherein the skill control corresponds to a skill of a first virtual character;

controlling a release direction of the skill according to the second touch operation; when the first touch operation and the second touch operation are detected at least partially overlap in timing, determining a focus position in the release direction, and updating the scene display area in a game scene according to the focus position in the release direction wherein a virtual camera corresponding to the first virtual character is provided in the game scene, and the scene display area in the game scene is an area shot by the virtual camera;

wherein updating the scene display area according to the first touch operation comprises:

controlling a movement of the virtual camera according to a movement track of a touch point of the first touch operation; and updating the scene display area according to the movement of the virtual camera;

wherein updating the scene display area according to the focus position comprises:

detecting an operation state of a touch point of the second touch operation; when determining that a rest time period of the touch point exceeds a preset threshold according to the operation state, controlling the virtual camera to move from a current position to the focus position at a preset speed; and updating the scene display area according to the movement of the virtual camera.

14. A terminal, comprising: at least one processor, a memory, a display device, and at least one program, wherein the at least one program is stored in the memory, and configured to be run by the at least one processor, the at least one program being configured to perform an in-game display control method, the in-game display control method comprises:

detecting a first touch operation acting on a preset area of a graphical user interface, wherein the preset area is a mini map on the graphical user interface or a horizon adjustment area on the graphical user interface;

updating a scene display area according to the first touch operation;

detecting a second touch operation acting on a skill control of the graphical user interface, wherein the skill control corresponds to a skill of a first virtual character;

controlling a release direction of the skill according to the second touch operation;

when the first touch operation and the second touch operation are detected at least partially overlap in timing, determining a focus position in the release direction, and updating the scene display area in a game scene according to the focus position in the release direction;

wherein a virtual camera corresponding to the first virtual character is provided in the game scene, and the scene display area in the game scene is an area shot by the virtual camera;

wherein updating the scene display area according to the first touch operation comprises:

controlling a movement of the virtual camera according to a movement track of a touch point of the first touch operation; and updating the scene display area according to the movement of the virtual camera;

wherein updating the scene display area according to the focus position comprises:

detecting an operation state of a touch point of the second touch operation; when determining that a rest time period of the touch point exceeds a preset threshold according to the operation state, controlling the virtual camera to move from a current position to the focus position at a preset speed; and updating the scene display area according to the movement of the virtual camera.

* * * * *